United States Patent [19]

Kimura et al.

[11] Patent Number: 4,595,964
[45] Date of Patent: Jun. 17, 1986

[54] MAGNETIC HEAD AND METHOD OF MAKING THE SAME

[75] Inventors: Kazuo Kimura, Yokohama; Kunihide Sakai, Ebina; Chikara Inoue, Hiratsuka; Hiroyuki Hayashi, Rokkakubashi; Toyoaki Takayasu, Tokyo; Yasuhiro Ayabe; Kayoko Miyake, both of Yokohama, all of Japan

[73] Assignee: Victor Company of Japan, Limited, Yokohama, Japan

[21] Appl. No.: 461,057

[22] Filed: Jan. 26, 1983

[30] Foreign Application Priority Data

Jan. 28, 1982 [JP] Japan ................................. 57-12296

[51] Int. Cl.$^4$ ................................. G11B 5/12
[52] U.S. Cl. ................................. 360/125; 360/121; 360/119
[58] Field of Search ................................. 360/125–126, 360/119, 120, 127; 29/603

[56] References Cited

U.S. PATENT DOCUMENTS

| 4,217,613 | 8/1980 | Schwartz ................. 360/125 X |
| 4,475,137 | 10/1984 | Yasuda et al. ................. 360/126 |

FOREIGN PATENT DOCUMENTS

| 1474335 | 7/1969 | Fed. Rep. of Germany . |
| 2754536 | 6/1978 | Fed. Rep. of Germany . |
| 3103767 | 12/1981 | Fed. Rep. of Germany . |
| 1225832 | 2/1960 | France . |
| 1009281 | 11/1965 | United Kingdom . |
| 1036001 | 7/1966 | United Kingdom . |
| 1310575 | 3/1973 | United Kingdom . |
| 1339415 | 12/1973 | United Kingdom . |
| 1356814 | 6/1974 | United Kingdom . |
| 1385946 | 3/1975 | United Kingdom . |
| 1411234 | 10/1975 | United Kingdom . |

OTHER PUBLICATIONS

Patents Abstracts of Japan, vol. 4, No. 78 (P-14) (560), Jun. 6, 1980, p. 50 P 14; & JP-A-55 42 379 (Matsushita Denki Sangyo K.K.) (25-03-1980) the whole.
Patents Abstracts of Japan, vol. 4, No. 27 (P-1) (509), Mar. 7, 1980, p. 119 P 1; & JP-A-55 1673 (Matsushita Denki Sangyo K.K.) (08-01-1980)–the whole.
Patents Abstracts of Japan, vol. 5, No. 21 (P-48) (693), Feb. 7, 1981; & JP-A-55 150 131 (Fujitsu K.K.) (21-1-1-1980)–the whole.
Patents Abstracts of Japan, vol. 5, No. 38 (P-52) (710), Mar. 21, 1981; & JP-A-55 160 321 (Hitachi Seisakusho K.K.) (13-12-1980)–the whole.
Patents Abstracts of Japan, vol. 1, No. 49, Apr. 6, 1978, p. 780 E 78; & JP-A-53 12 316 (Matsushita Denki Sangyo K.K.) (03-02-1978)–the whole.
Patents Abstracts of Japan, vol. 1, No. 132, Oct. 31, 1977, p. 5951 E 77; & JP-A-52 66 413 (Sanyo Denki K.K.) (01-06-1977) the whole.
Patents Abstracts of Japan, vol. 6, No. 116 (P-125) (994), Jun. 29, 1982 & JP-A-57 44 216 (Sony K.K.) (12-03-1982)–the whole.

Primary Examiner—John H. Wolff
Attorney, Agent, or Firm—Pollock, VandeSande & Priddy

[57] ABSTRACT

A magnetic head for tape recording and/or reproducing is composed of a pair of abutting thin magnetic metal cores with front and back gaps therebetween, and a pair of magnetic oxide cores sandwiching each of the magnetic metal cores therebetween. The magnetic oxide cores include bodies of glass disposed adjacent the front gap and sandwiching each magnetic metal core to allow the front gap to be visually checked for its depth. To fabricate such a magnetic head, magnetic oxide cores are bonded to a thin magnetic metal core, and the bonded block is cut off across the magnetic metal core to form two block pieces. Each of the block pieces is provided with bodies of glass in recesses formed in a cut surface thereof. After the cut surfaces have been ground, the block pieces are bonded with the cut surfaces confronting each other while keeping the magnetic metal cores in alignment. The bonded block pieces are cut off along the aligned magnetic metal cores into a magnetic head blank, which is then ground to provide a tape-contacting surface.

2 Claims, 6 Drawing Figures

MAGNETIC HEAD AND METHOD OF MAKING THE SAME

BACKGROUND OF THE INVENTION

The present invention relates to a magnetic head for recording and/or reproducing signals on and/or from a magnetic tape at a high density and a method of making such a magnetic head.

Magnetic tapes for video tape recording have heretofore been composed of a backing material coated with a thin magnetic film of magnetic oxide particles. To meet demands for signal recording at a higher density, there have been developed in the recent past magnetic tapes having a magnetic coating of fine metal particles or a deposited metal film. These metallic-coating tapes have a higher coercivity than that of conventional oxide-particle tapes. However, prior magnetic recording heads, that is, heads with ferrite oxide cores, cannot magnetize the metallic-coating tapes sufficiently as the cores tend to be easily saturated.

Various magnetic heads for high-density recording have been developed which include metal cores made by materials such as Sendust or amorphous materials having a saturation magnetic flux density higher than that of magnetic oxides. It is known that magnetic heads having Sendust cores undergo a reduced permeability in a high-frequency region due to an eddy-current loss and are less resistant to wear than conventional oxide heads, and amorphous heads suffer from a poor high-frequency response because of the heat treatment or high-temperature heating that the core is subjected to in the manufacturing process.

Therefore, it is necessary that magnetic heads of Sendust or amorphous materials be constructed in order to eliminate the foregoing problems. One conventional high-density magnetic head includes a pair of magnetic cores of Sendust, one having a winding slot, which are butted together with a thin gap-defining shim interposed therebetween and are ground into a thin web having a thickness of over ten microns. The cores are sandwiched between nonmagnetic plates having winding slots and bonded thereto, with a tape-contacting surface ground to a desired finish. This type of magnetic head has been disadvantageous in that with the magnetic cores being of a small cross-sectional area, the head has a poor playback efficiency. Since the cores are thinned by being ground after the gap has been defined, the gap is liable to get spread widely open or broken during the grinding process. Furthermore, the nonmagnetic plates which cover the cores prevent the gap depth from being measured correctly while the tape-contacting surface is being ground, with the result that the gap depth cannot be precisely defined.

Another conventional magnetic head is composed of a pair of magnetic oxide cores of ferrite held in abutting relation and having magnetic bodies of Sendust only at the tape-contacting surface. Since the cores have a greater cross-sectional area than that of the magnetic head as described above, the head has a better playback efficiency. However, the magnetic path in the head contains junctions between the Sendust bodies and the oxide cores, the junctions giving rise to an unwanted magnetic loss which fails to achieve a sufficiently high playback efficiency.

SUMMARY OF THE INVENTION

It is an object of the present invention to provide a magnetic head used for tape recording and/or reproducing which has a large value of saturation flux, an improved playback efficiency and a gap depth that can be easily dimensioned to a precision.

Another object of the present invention is to provide a method of making such a magnetic head.

According to the present invention, a magnetic head comprises a pair of thin magnetic metal cores abutting against each other with front and back gaps therebetween and having a tape-contacting surface extending across the front gap, the magnetic metal cores jointly defining a magnetic path extending from the front to back gaps, and a pair of magnetic oxide cores laterally sandwiching each of the magnetic metal cores. The magnetic oxide cores include a pair of bodies of glass, respectively, disposed adjacent to the front gap and held in sandwiching relation to each magnetic metal core to allow the front gap to be visually checked for its depth. According to a method of making such magnetic head, a pair of magnetic oxide cores are bonded to a thin magnetic metal core on both sides thereof to provide a block which is cut off along a direction transverse to the magnetic metal core into a pair of first and second block pieces, and a pair of recesses are defined one on each side of the magnetic metal core in a cut surface of each of the first and second block pieces. A body of glass is then sealed in each of the recesses. The first and second block pieces are bonded together with the cut surfaces thereof confronting each other with a gap-forming shim interposed therebetween while providing alignment between the magnetic metal cores of the first and second block pieces. The bonded first and second block pieces are cut off along lines extending parallel to the aligned magnetic metal cores on both sides thereof across the bodies of glass to form a magnetic head blank, which is ground to provide a tape-contacting surface.

BRIEF DESCRIPTION OF THE DRAWINGS

The present invention will be described in detail by way of illustrative example with reference to the accompanying drawings, in which.

DETAILED DESCRIPTION

Figure 1:
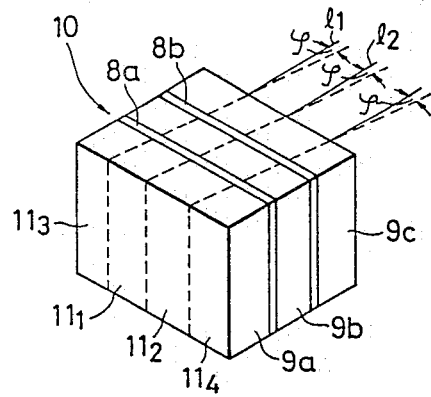
FIGS. 1 through 5 are perspective views illustrative of successive steps of a method of making a magnetic head in accordance with the present invention.

FIGS. 1 through 5 show a sequence of steps of fabricating a magnetic head according to the present invention. As illustrated in FIG. 1, a pair of magnetic metal cores (hereinafter referred to as "metal cores") $8a$, $8b$ such as of Sendust are thinned by a distortion-free process such as mechanochemical lapping or etching into thin webs having a thickness of over ten microns. The metal cores $8a$, $8b$ are sandwiched laterally between magnetic oxide cores (hereinafter referred to as "oxide cores") $9a$, $9b$, $9c$ such as of ferrite and bonded thereto by an organic adhesive to form a core block 10. The core block 10 is then cut off by a cutter blade along as many lines $l_2$ as required (three in the illustrated embodiment) extending at an angle $\phi$ equal to the azimuth of a magnetic head to be produced with respect to lines $1_1$ normal to the metal cores 8a, 8b, thus forming four block pieces $11_1$ through $11_4$.

Figure 2:
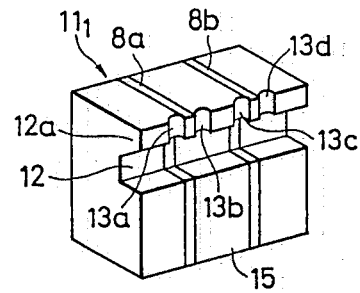

Only the block pieces $11_1$ and $11_2$ positioned between the block pieces $11_3$ and $11_4$ are used for fabricating magnetic heads, and the block pieces $11_3$ and $11_4$ at both ends are rejected. As illustrated in FIG. 2, a transverse winding slot 12 is formed in the block piece $11_1$ at its one side, and semicylindrical glass sealing recesses 13a through 13d are formed vertically in a nose portion 12a projecting in overhanging relation to the winding slot 12, the recesses 13a, 13b being positioned one on each side of the metal core 8a and the recesses 13c, 13d one on each side of the metal core 8b. It is preferred that the recesses 13a through 13d should not extend into the metal cores 8a, 8b. However, if the exposed ends of the metal cores 8a, 8b are narrowed by the recesses 13a through 13d, they can later be restored to a correct width equal to a required track width in a subsequent process step in which a gap abutment surface 15 of the block piece $11_1$ is ground.

Figure 3:
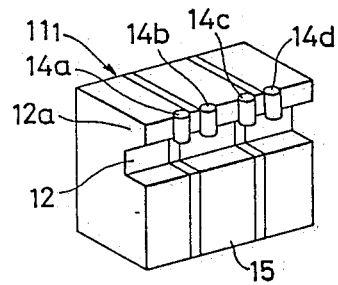
Figure 4:
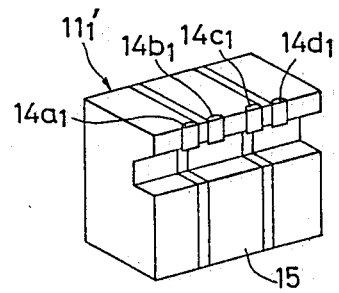

Then, cylindrical bodies of glass 14a through 14d are sealingly placed in the recesses 13a through 13d, respectively, and bonded to the block piece $11_1$ by an inorganic adhesive, as shown in FIG. 3. The block piece $11_1$ is ground at the gap abutment surface 15 to a mirror finish, thereby producing a block piece $11_1'$ having semicylindrical glass bodies $14a_1$ through $14d_1$ as shown in FIG. 4. A gap-defining shim made of SiO$_2$ is deposited on the gap abutment surface 15 by sputtering or other process.

The block piece $11_2$ shown in FIG. 1 is not provided with any winding slot, but is formed with vertical glass sealing recesses, which receive therein cylindrical glass bodies bonded to the block piece $11_2$. A gap abutment surface of the block piece $11_2$ is then ground to a mirror finish to provide a block piece $11_2'$ having semicylindrical glass bodies $14a_2$ through $14d_2$, as shown in FIG. 5.

Figure 6:
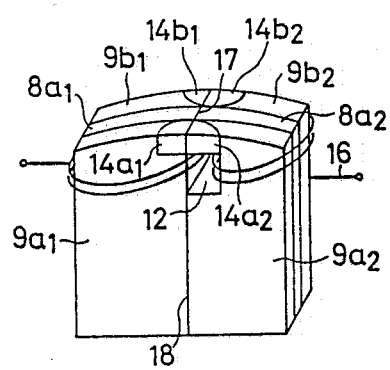
FIG. 6 is a perspective view of a magnetic head according to the present invention.
Figure 5:
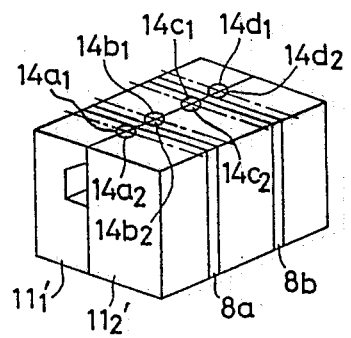

In FIG. 5, the block pieces $11_1'$, $11_2'$ are butted together with their gap abutment surfaces held against each other while keeping the metal cores 8a in mutual longitudinal alignment with each other, and bonded with each other by an organic adhesive. Then, the bonded block pieces $11_1'$, $11_2'$ are cut off along dot-and-dash lines extending parallel to the cores 8a, 8b and across the glass bodies $14a_1$ through $14d_1$ in the block piece $11_1'$ and the glass bodies $14a_2$ through $14d_2$ in the block piece $11_2'$, respectively, thereby providing magnetic head blanks. Each of the magnetic head blanks is ground to form a tape-contacting surface of desired curvature and smoothness, and a coil 16 (FIG. 6) is wound through the winding slot 12, thus completing a magnetic head as shown in FIG. 6. The magnetic head has a front gap 17 and a back gap 18. The glass bodies $14a_1$, $14a_2$ on one side of the metal cores $8a_1$, $8a_2$ are jointly of a substantially semicylindrical shape having a peripheral surface disposed adjacent to the front gap 17 to allow the latter to be visually checked for its depth, and so are the glass bodies $14b_1$, $14b_2$ on the other side of the metal cores $8a_1$, $8a_2$.

With the present invention, the magnetic head comprises a pair of metal cores $8a_1$, $8a_2$ sandwiched between oxide cores $9a_1$, $9b_1$ and between oxide c ores $9a_2$, $9b_2$, respectively, with glass bodies $14a_1$, $14a_2$, $14b_1$, $14b_2$ exposed on the tape-contacting surface of the oxide cores $9a_1$, $9a_2$, $9b_1$, $9b_2$ adjacent to the front gap of the head.

The exposed glass bodies allow the depth of the front gap between the metal cores $8a_1$, $8a_2$ to be visually checked therethrough from the exterior. Therefore, the tape-contacting surface of the magnetic head can be ground while the gap depth is being measured with a microscope or the like. As a result, the gap depth can be easily dimensioned to a predetermined depth that is usually in the range of from 20 to 30 microns with higher accuracy than would be possible with conventional magnetic heads.

The metal cores may be of a material other than Sendust. For example, the metal cores may be fabricated of amorphous materials in a process identical with the above-mentioned process.

The magnetic head has a magnetic path composed of the thin metal cores $8a_1$, $8a_2$ extending between front and back gaps of the head and sandwiched between the oxide cores $9a_1$, $9b_1$ and $9a_2$, $9b_2$. This arrangement provides a magnetic body wider in cross-sectional area for better playback efficiency than the conventional head having metal cores sandwiched between nonmagnetic cores, and does not suffer from a magnetic loss which would be occasioned by junctions in the magnetic path between magnetic metal bodies and oxide cores in the prior head in which the magnetic metal bodies are disposed only on the tape-contacting surface of the oxide cores. Since the glass bodies $14a_1$, $14a_2$, $14b_1$, $14b_2$ are provided adjacent to the front gap between the metal cores $8a_1$, $8a_2$, the depth of the front gap can be visually checked and measured while the tape-contacting surface is being ground, with the consequence that the gap depth can be dimensioned with high accuracy and utmost ease. By selecting the optimum hardness of the glass bodies exposed on the tape-contacting surface, wear on the latter and a gap loss between the tape-contacting surface and the magnetic tape can be held to a minimum. According to the method of the present invention, the metal cores $8a_1$, $8a_2$ are first ground into thin webs of a desired thickness and subsequently the gap-defining shim is placed between the core blocks $11_1'$, $11_2'$. This processing sequence prevents the gap from being spread apart or broken in the grinding step, and hence facilitates fabrication of magnetic heads.

Although a certain preferred embodiment of the present invention has been shown and described in detail, it should be understood that various changes and modifications may be made therein without departing from the scope of the appended claims.

What is claimed is:

1. A magnetic head comprising:
   two thin metallic magnetic cores held in abutment for defining therebetween a front head gap and a back head gap, a magnetic flux path being provided by the abutted metallic cores from the front head gap to the back head gap;
   a pair of magnetic oxide cores sandwiching the metallic cores, each of said magnetic oxide cores including a back head gap aligned in line with said front and back head gaps and a recess at an end thereof;
   whereby the combination metallic and oxide cores defines a tape contacting surface including the front gap, said recesses of said oxide cores being exposed on the tape contacting surfaces in the vicinity of the front head gap.

2. A magnetic head according to claim 1, wherein a body of glass is filled in each of said recesses.

* * * * *